United States Patent [19]

McClure

[11] Patent Number: 5,254,608
[45] Date of Patent: Oct. 19, 1993

[54] ULTRAVIOLET SCREENER BLENDS

[75] Inventor: George R. McClure, Claymont, Del.

[73] Assignee: E. I. Du Pont de Nemours and Company, Wilmington, Del.

[21] Appl. No.: 423,364

[22] Filed: Oct. 19, 1989

[51] Int. Cl.⁵ .......................... C08K 5/34; C08K 5/07
[52] U.S. Cl. ........................ 524/91; 524/99; 524/102; 524/359
[58] Field of Search ............. 324/91, 359, 99, 102

[56] References Cited

U.S. PATENT DOCUMENTS

| | | | |
|---|---|---|---|
| 2,484,483 | 10/1949 | Berry | 524/359 |
| 2,953,818 | 9/1960 | Bartron | 18/57 |
| 3,139,470 | 6/1964 | Prengle et al. | 264/289 |
| 3,935,164 | 1/1976 | Spivack et al. | 524/91 |
| 4,861,813 | 8/1989 | Seltzer et al. | 524/91 |

Primary Examiner—Kriellion S. Morgan

[57] ABSTRACT

A blend of ultraviolet screeners which results in excellent screening, but which does not interfere with the optical clarity of polymeric films such as poly(vinyl fluoride).

9 Claims, No Drawings

ULTRAVIOLET SCREENER BLENDS

BACKGROUND OF THE INVENTION

Fluoropolymer films have long been used in applications where the finished film is exposed to ultraviolet light. For example, poly(vinyl fluoride) films are often used as a protective surface on building materials such as aluminum and poly(vinyl chloride) house siding. To prevent degradation, by the ultraviolet light, of film itself and either a bonding layer or a substrate beneath the film, screeners have often been incorporated into the films.

In the past, poly(vinyl fluoride) films were typically used which had been molecularly oriented in one or both of the machine and transverse directions. More recently, however, unoriented films have been needed for protective applications in which a high degree of clarity was also desired. It was found that the ultraviolet light screeners, of the types and in the concentrations previously used in poly(vinyl fluoride) films, did not provide the optical clarity required for certain decorative applications.

SUMMARY OF THE INVENTION

The present invention provides fluoropolymer films having ultraviolet screeners which result in excellent screening, but which do not interfere with the optical clarity of films.

Specifically, the instant invention provides, in a fluoropolymer film comprising up to about 10 weight % of ultraviolet light absorber, the improvement wherein the film comprises at least two ultraviolet light absorbers, each absorber having a molecular weight less than that which will form a visible separate phase in the fluoropolymer; each absorber present in a quantity below the saturation level of that absorber in the fluoropolymer; and each absorber having a molecular structure which differs chemically from each other absorber.

DETAILED DESCRIPTION OF THE INVENTION

The present invention is applicable to fluoropolymer films, such as those prepared from tetrafluoroethylene polymers and copolymers. The present invention is particularly well suited to poly(vinyl fluoride) films, the nature and preparation of which are described in detail in U.S. Pat. Nos. 3,139,470, 2,953,818, 2,419,008, 2,510,783 and 2,599,300, all of which are hereby incorporated by reference. Specifically, the invention is applicable to those films containing up to about 10 weight % of ultraviolet light absorber, and especially about from 1 to 7.5 weight %.

The ultraviolet light absorbers which can be used in the present invention are selected from the general classes of monomeric or low molecular weight oligomeric absorbers previously used in the art. These include hydroxy benzophenones, hydroxy benzo triazoles, oxanilides and substituted cyanoacrylates. Specific compounds of these types which can be used are more fully described in U.S. Pat. Nos. 4,314,933, 3,278,589 and 3,935,164, hereby incorporated by reference. Still other known stabilizers which can be used in the present invention are hindered amine stabilizers, which can also neutralize the species that ultraviolet light generates.

In accordance with the instant invention, at least two ultroviolet light absorbers are incorporated into the fluoropolymer film. Each ultraviolet light absorber has a molecular weight less than that which will form a visible separate phase in the polymer. Accordingly, the absorbers are substantially monomeric, or of such lower oligomeric molecular weight that they will neither form a visible separate phase or agglomerate to form such a phase at the concentration used. While the specific molecular weight will vary, in general, molecular weights of the absorbers should not exceed about 5,000.

Each ultraviolet light absorber is incorporated into the polymer blend in a quantity below the saturation level of that absorber in the polymer, that is, the percentage at which the absorber is incompatible with the fluoropolymer in which it is used. In general, up to about 2.5 parts by weight of each absorber per hundred parts of resin (phr) can be used. To provide the most complete screen of ultraviolet light in the finished product, at least three screeners are preferably used, and six or more can be beneficially used. In general, with poly(vinyl fluoride), a total absorber concentration of about 7.5 phr is adequate to render the film substantially opaque to ultroviolet light. Little additional benefit is realized with higher concentrations of absorber.

Each absorber should have a molecular structure which differs chemically from each other absorber. The difference can be as little as one substituent in the structure, or the absorbers can be selected from different classes of absorbers.

For poly(vinyl fluoride) films, a particularly desirable combination of ultraviolet light absorbers is that which comprises about from 0.5 to 3.5 parts of at least one benzotriazole, about from 0.5 to 2.0 parts of at least one benzophenone, and about from 0.5 to 2.0 parts of at least one oxanilide.

While the mechanism of the present invention is not fully understood, it is believed to be based on Dalton's law of solubility, according to which each gas or solute in a blend will exhibit its own solubility independent of other dissolved gasses or solutes. Thus, the presence of two or more ultraviolet light absorbers, each below its solubility limit in the polymeric material, provide an additive effect on the absorption of ultraviolet light without interfering with the optical clarity of the film through incompatibility.

The absorbers incorporated in the present films, for optimal performance, should also exhibit a low volatility. Specifically, the temperature at which 10% of the absorber is volatilized, $T_{10}$, is preferably greater than about 200° C.

The absorbers can be incorporated into the polyvinyl films by any convenient method, depending on both the particular absorber and the film. However, it has been found to be convenient and efficient to first dissolve or disperse the absorber in the liquid that is used as the coalescing solvent for the fluoropolymer dispersion, and then milling the resulting solution into the dispersion.

The fluoropolymer films of the present invention can, as will be recognized by those skilled in the art, further comprise additives, such as plasticizers, pigments, thermal stabiliizers, and flow control agents, all as previously used in such films.

The present invention will be more fully understood by reference to the following Examples, in which parts and percentages are by weight unless otherwise indicated. In these Examples, the UV screeners and hindered amines used are identified by their common names, as follows:

| Common Name | Chemical Name |
| --- | --- |
| Benzotriazole-1 | 5-t-butyl-3-(5-chloro-2H-benzotriazol-2-yl)-4-hydroxy-benzenepropionic acid octyl ester or "Tinuvin" 109 by Ciba Geigy. |
| Benzotriazole-2 | a mixture of poly(oxy-1,2 ethanediyl), a-(3-(3-(2H-benzotriazol-2-yl)5-(1,1-dimethylethyl)-4-hydroxyphenyl)-1-oxopropyl-w-hydroxy and Poly(oxy-1,2-ethanediyl), a-(3-(3-(2H-benzotriazole-2-yl)-5-(1,1-dimethylethyl)-4-hydroxy-phenyl-1-oxopropyl-w-3-3-(2H-benzotriazol-2-yl)-5-(1,1-dimethylethyl)-4-hydroxyphenyl)-1-oxopropoxy) or "Tinuvin" 1130 by Ciba Geigy. |
| Benzotriazole-3 | 2-(2-hydroxy-3,5-di(1,1-dimethyl-benzyl)phenyl)-2H-benzotriazole or "Tinuvin" 900 by Ciba Geigy. |
| Benzotriazole-4 | 2-(3',5'-di-t-amyl-2'-hydroxy-phenyl)benzotriazole or "Tinuvin" 328 by Ciba Geigy. |
| Benzophenone-1 | 2-Hydroxy-4-n-Dodecyloxybenzo-phenone or "UV-Check" AM 320 by Ferro Chemicals. |
| Benzophenone-2 | 2-Hydroxy-4-n-octyloxybenzophenone or "Cyasorb" 531 from American Cyanamid. |
| Oxanilide-1 | Ethane diamide-N-(2-ethoxy phenyl)-N-(4-isodeoyl phenyl) is "Sanduvor" 3206 by Sandoz Chemicals. |
| Hindered Amine-1 | 2,2,4,4-Tetramethyl-20-(B-lauryl-oxycarbonyl)-ethyl-7-oxa-3, 20 diazaspiro (5,1,11,2) heneicosane-21-one or "Sanduvor" 3050 by Sandoz Chemicals. |
| Hindered Amine-2 | 8-Acetyl-3-dodecyl-7,7,9,9-tetramethyl-1,3,8-Triazaspiro (4.5) decane-2,4-dione or "Tinuvin" 440 by Ciba Geigy. |

EXAMPLE 1

A poly(vinyl fluoride) film was prepared containing a mixture of six ultraviolet light absorbers. To 300 parts of a 33% by weight dispersion of poly(vinyl fluoride) in propylene carbonate (Tedlar 44-1000 from Du Pont) solutions of the following six absorbers were added with stirring, in the order specified:

1. 5 parts of a 20% solution of benzotriazole-1 in N-methylpyrrolidone:
2. 5 parts of a 20% solution of oxanilide-1 in propylene carbonate:
3. 5 parts of a 20% solution of benzophenone-1 in N-methylpyrrolidone:
4. 3.75 parts 20% solution of benzotriazole-2 in propylene carbonate:
5. 2.5 parts of a 20% solution of benzotriazole-3 in N-methylpyrrolidone; and
6. 2.5 parts of a 20% solution of benzophenone-2 in propylene carbonate.

This mixture was stirred 30 min. after the last addition was complete and shaken on a paint shaker for 30 minutes. Each absorber had a molecular weight less than that which will form a visible separate phase in the poly(vinyl fluoride), and each absorber was added in a quantity below the saturation level of that absorber.

The resulting mixture was coated on a 2 mil polyester film using a doctor knife and baked in a rapid recovery oven for 3 minutes at 400° F. The resulting film easily stripped from the polyester, was 1 mil in thickness, haze-free with no surface exudate and had an absorbance of 4.2 at 300 nanometers and less than 0.2 at 400 nanometers.

EXAMPLE 2

To 100 parts propylene carbonate were added 0.8 parts of benzotriazole-4, 0.8 parts benzophenone-2 and 0.8 parts of oxanilide-1. The mixture was stirred and warmed until solution was complete, then 50 parts of finely divided poly(vinyl fluoride) (PV-116 from Du Pont) was added and the mixture sand milled for 30 minutes. The resulting dispersion was coated onto a glass plate using a doctor knife and baked 10 minutes at 400° F. On stripping, the resulting 27 micron film was haze-free, clear and colorless, confirming that each of the three absorbers had a molecular weight less than that which will form a visible separate phase in the poly(vinyl fluoride), and each absorber was added in a quantity below the saturation level of that absorber. The film had an absorbance of 3.1 at 300 nanometers and 0.2 at 400 nanometers.

EXAMPLE 3

To 1000 parts of 33.3% poly(vinyl fluoride) dispersion in propylene carbonate (Tedlar ® 44-1000, Du Pont) the following five solutions of ultraviolet light absorbers were added with stirring:

(1) 53.4 parts of 10% solution of benzotriazole-1 in N-methylpyrrolidone;
(2) 53.4 parts 10% solution of benzophenone-2 in propylene carbonate;
(3) 16.7 parts 10% solution of benzotriazole-2 in propylene carbonate;
(4) 16.7 parts 10% solution of oxanilide-1 in propylene carbonate; and
(5) 8.3 parts of 10% solution of benzotriazole-3 in N-methylpyrrolidone.

The mixture was stirred 30 minutes after the last addition and sand milled for 30 minutes. The resulting dispersion was applied to a 3 mil polyester carrier film with a #66 Meyer rod, and baked in a high velocity oven (air velocity 10,000 ft/min) at 410° F. for 1 min. The product was a 1.3 mil, haze-free, colorless film of poly(vinyl fluoride), confirming that each of the absorbers had a molecular weight less than that which will form a visible separate phase in the poly(vinyl fluoride), and that each absorber was added in a quantity below the saturation level of that absorber. The film was easily removable from the carrier film. Absorbance of the poly(vinyl fluoride film) was 4.5 at 300 nanometers and 0.21 at 400 nanometers. By comparison a poly(vinyl fluoride) film without UV absorbers has absorbance of 0.09 @300 nm and 0.01 at 400 nm.

EXAMPLE 4

A film was prepared using the general procedure of Example 3, from a mixture composed of 1000 parts of 33.3% by weight dispersion of poly(vinyl fluoride) in propylene carbonate, to which were added, with stirring, the following solutions of ultraviolet light absorbers:

(1) 26.7 parts of a 20% solution of benzotriazole-1 in N-methylpyrrolidone:
(2) 26.7 parts of a 20% solution of benzophenone-2 in propylene carbonate;

(3) 20.0 parts of a 20% solution of oxanilide-1 in propylene carbonate; and (4) 10.0 parts of a 20% solution of benzotriazole-2 in propylene carbonate.

The resulting film was haze-free, colorless and substantially free of exudate, confirming that each of the absorbers had a molecular weight less than that which will form a visible separate phase in the poly(vinyl fluoride), and that each absorber was added in a quantity below the saturation level of that absorber. A 1.3 mil film had an absorbance of 3.9 at 300 nm and 0.21 at 400 nm.

EXAMPLE 5

A casting mixture was prepared by sand milling 1000 parts 33.3% poly(vinyl fluoride) dispersion in propylene carbonate, to which were added, with stirring, the following solutions of ultraviolet light absorbers:

(1) 15.8 parts 20% solution of benzotriazole-1 in N-methylpyrrolidone;

(2) 15.8 parts of a 20% solution of oxanilide-1 in propylene carbonate;, (3) 15.8 parts of 20% solution of benzophenone-1 in N-methylpyrrolidone;

(4) 11.8 parts of 20% solution of benzotriazole-2 in propylene carbonate;

(5) 7.9 parts of 20% solution of benzotriazole-3 in N-methylpyrrolidone;

(6) 7.9 parts of 20% solution benzophenone-2 in propylene carbonate;

(7) 7.9 parts of 20% solution of hindered amine light stabilizer-1 in N-methylpyrrolidone; and (8) 7.9 parts of 20% solution of hindered amine light stabilizer-2 in N-methylpyrrolidone.

This dispersion was treated as in Example 3 to give a haze-free, clear, colorless 1.3 mil film substantially free of exudate. The absorbance of this film was 3.9 at 300 nm and 0.2 at 400 nm.

COMPARATIVE EXAMPLES A-I

In Comparative Examples, A-I, poly(vinyl fluoride) films were prepared and tested containing a variety of UV screeners. A single screener was used in each Comparative Example at a concentration of 3 phr. While below the total screener concentration in Examples 1-5 above, the resulting films were unsatisfactory in one or more respects, as indicted below. Accurate absorbancy values cannot be obtained on inhomogeneous systems. On the basis of Beer's Law they are calculated to be 2.5 to 2.75 @300 nm compared to 3.1 to 4.5 for the films of Examples 1-5.

Table for Comparative Examples A-I

| Example | UV Screener/ Hindered amine | T10* | Description of 1.2 mil film @ 3 phr additive |
|---|---|---|---|
| A | Benzotriazole-1 | 270 | Moderate-Severe liquid surface exudate |
| B | Benzotriazole-2 | 275 | Severe surface haze & exudate |
| C | Benzotriazole-3 | >250 | Severe internal haze & powdery exudate |
| D | Benzotriazole-4 | 230 | Severe powder exudate |
| E | Benzophenone-1 | 275 | Severe oily surface exudate |
| F | Benzophenone-2 | 245 | General film haze & crystalline exudate |
| G | Oxanilide-1 | >250 | Sticky, oily surface exudate |
| H | Hindered Amine-1 | 280 | Severe sticky, oily surface exudate |
| I | Hindered Amine-2 | 275 | Severe powdery surface exudate |

*T10 - During thermogravimetric analysis (heating at 10° C./min) T10 is the temperature in °C. at which 10% of the material is lost.

I claim:

1. In a fluoropolymer film comprising up to about 10 weight % of ultraviolet light absorber, the improvement wherein the film comprises at least three ultraviolet light absorbers, each absorber having a molecular weight less than that which will form a visible separate phase in the fluoropolymer; each absorber present in a quantity below the saturation level of that absorber in the fluoropolymer; and each absorber having a molecular structure which differs chemically from each other absorber.

2. A film of Claim 1 wherein the ultroviolet light absorbers are selected from the groups consisting of hydroxy benzophenones, hydroxy benzotriazoles, oxanilides and substituted cyanoacrylates.

3. A film of Claim 1 wherein the fluoropolymer consists essentially of poly(vinyl fluoride).

4. A film of claim 1 wherein the volatility of each absorber is such that the temperature at which 10% of the absorber is volatilized is greater than about 200° C.

5. A film of Claim 1 wherein each ultraviolet light absorber has a molecular weight of less than about 5,000.

6. A film of Claim 1 which is substantially unoriented.

7. A film of Claim 2 wherein the ultraviolet light absorbers comprise about from 0.5 to 3.5 parts of at least one benzotriazole, about from 0.5 to 2.0 parts of at least one benzophenone, and about from 0.5 to 2.0 parts of at least one oxanilide.

8. A film of Claim 1 containing about from 1 to 7.5 weight % of ultraviolet light absorber.

9. A film of Claim 1 further comprising up to about 2 parts per hundred of at least one hindered amine light stabilizer.

* * * * *